Oct. 31, 1939.  L. GOLDHAMMER  2,177,770

PHOTOGRAPHIC CAMERA

Filed March 10, 1938

Inventor
Leo Goldhammer
By His Attorney
Philip S. Hopkins

Patented Oct. 31, 1939

2,177,770

UNITED STATES PATENT OFFICE 2,177,770

PHOTOGRAPHIC CAMERA

Leo Goldhammer, Munich, Germany, assignor, by mesne assignments, to Agfa Ansco Corporation, Binghamton, N. Y., a corporation of Delaware Application March 10, 1938, Serial No. 195,081
In Germany March 12, 1937

4 Claims. (Cl. 95—39)

My present invention relates to a photographic camera of the kind in which a panel carrying the lens and the shutter is connected by a lazy tongs link mechanism to the camera body so that the panel, while being moved into and out of the camera body, is maintained parallel to the focal plane. My invention pertains particularly to an improved device for locking the lazy tongs link mechanism.

It has previously been proposed to lock this lazy tongs link mechanism by means of spring pressed levers mounted on the lens panel. It is also well known to insure the setting of the lazy tongs by springs arranged in the camera casing and adapted to act upon the front sides of the rear ends of the lazy tongs. The devices hitherto known need additional elements at the lens panel which can be slightly damaged when the camera is in use. It is also necessary to arrange these elements in such a manner that the other parts mounted on the panel are not obstructed thereby.

The disadvantage of the known arrangement of the springs in the casing resides in the fact that the separately arranged springs do not effect a uniform blocking of the device.

It is an object of my invention to overcome this disadvantage and to provide a device for locking the lazy tongs link mechanism which is simple in construction and easy to operate.

Another object is the provision of a U-shaped stirrup adapted to act on the ends of the lazy tongs at the side of the casing by means of springs.

Another object is to provide a means capable of acting on lazy tongs simultaneously.

Still another object is to provide means for releasing the stirrup.

Further objects will appear from the detailed description following hereinafter.

An especial advantage of the device according to the invention resides in the fact that the stirrup which requires a minimum of space is arranged in and protected by the camera housing. The turning points of the stirrup are so selected that slight differences in manufacturing are compensated by a self-braking wedge-like action of the ends of its arms.

Reference is made to the accompanying drawing in which for the purpose of illustrating the invention a typical embodiment is represented.

Figure 1:
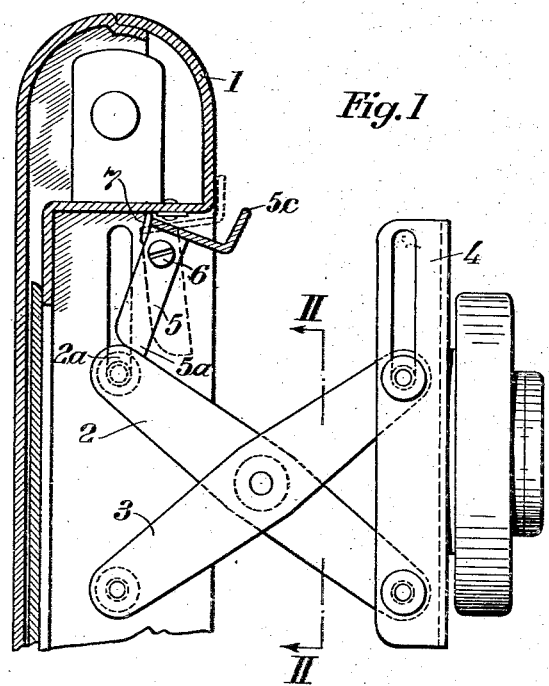
Figure 1 shows a sectional view of the camera in accordance with the invention, the casing being partially cut away.
Figure 2:
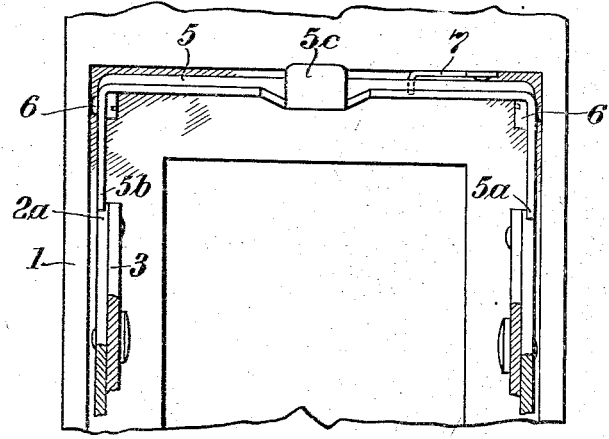
Figure 2 shows a section taken on the line II—II of Figure 1, looking in the direction of the arrows.

In the camera illustrated, 1 is the casing which is connected with the lens panel 4 by the lazy tongs 2 and 3. To the inner side of the casing there is attached a U-shaped stirrup 5, the ends 5a and 5b of which are adapted to pivot about the points 6 and 6a. The stirrup 5 is subjected to the action of a spring 7 which tends to keep it in the position shown in Figure 1. In this position the stirrup locks the ends 2a of lazy tongs at the side of the camera housing. The stirrup is furnished with an extension 5c adapted to move it before closing the camera from the locking position against the tension of the spring 7. Thereby the stirrup reaches the position as shown in dotted lines in Figure 1 and liberates the ends of the lazy tongs at the side of the camera body when the camera is folded up.

What I claim is:

1. In a photographic camera, in combination a camera casing, a lens panel, lazy tongs connecting said camera casing with said lens panel and adapted to move said lens panel in parallel relation to said camera casing, a stirrup, the arms of said stirrup being pivotally arranged at two points of the inner side of said camera casing, and means for pivotally swinging said arms to a position in which the ends of said arms lock the ends of said lazy tongs in the camera casing when the camera is open for exposure.

2. In a photographic camera, in combination a camera casing, a lens panel, lazy tongs connecting said camera casing with said lens panel and adapted to move said lens panel in parallel relation to said camera casing, a U-shaped stirrup, the arms of said stirrup being pivotally arranged at two points of the inner side of said camera casing, and means for pivotally swinging said arms to a position in which the ends of said arms lock the ends of said lazy tongs in the camera casing when the camera is open for exposure.

3. In a photographic camera, in combination, a casing, a lens panel, lazy tongs connecting said camera casing with said lens panel and adapted to move said lens panel in parallel relation to said camera casing, a stirrup in said casing having arms pivotally arranged at points on the inner opposite sides of said casing, and a spring in said casing engaging said stirrup for normally swinging said arms to a position in which the ends of said arms engage and lock the ends of said lazy tongs in the camera casing when the camera is open for exposure.

4. In a photographic camera, in combination, a casing, a lens panel, lazy tongs connecting said camera casing with said lens panel and adapted to move said lens panel in parallel relation to said camera casing, a stirrup in said casing having arms pivotally arranged at points on the inner opposite sides of said casing, and a spring in said casing engaging said stirrup for normally swinging said arms to a position in which the ends of said arms engage and lock the ends of said lazy tongs in the camera casing when the camera is open for exposure, and a finger piece on said stirrup for releasing said arms from locking position.

LEO GOLDHAMMER.